UNITED STATES PATENT OFFICE.

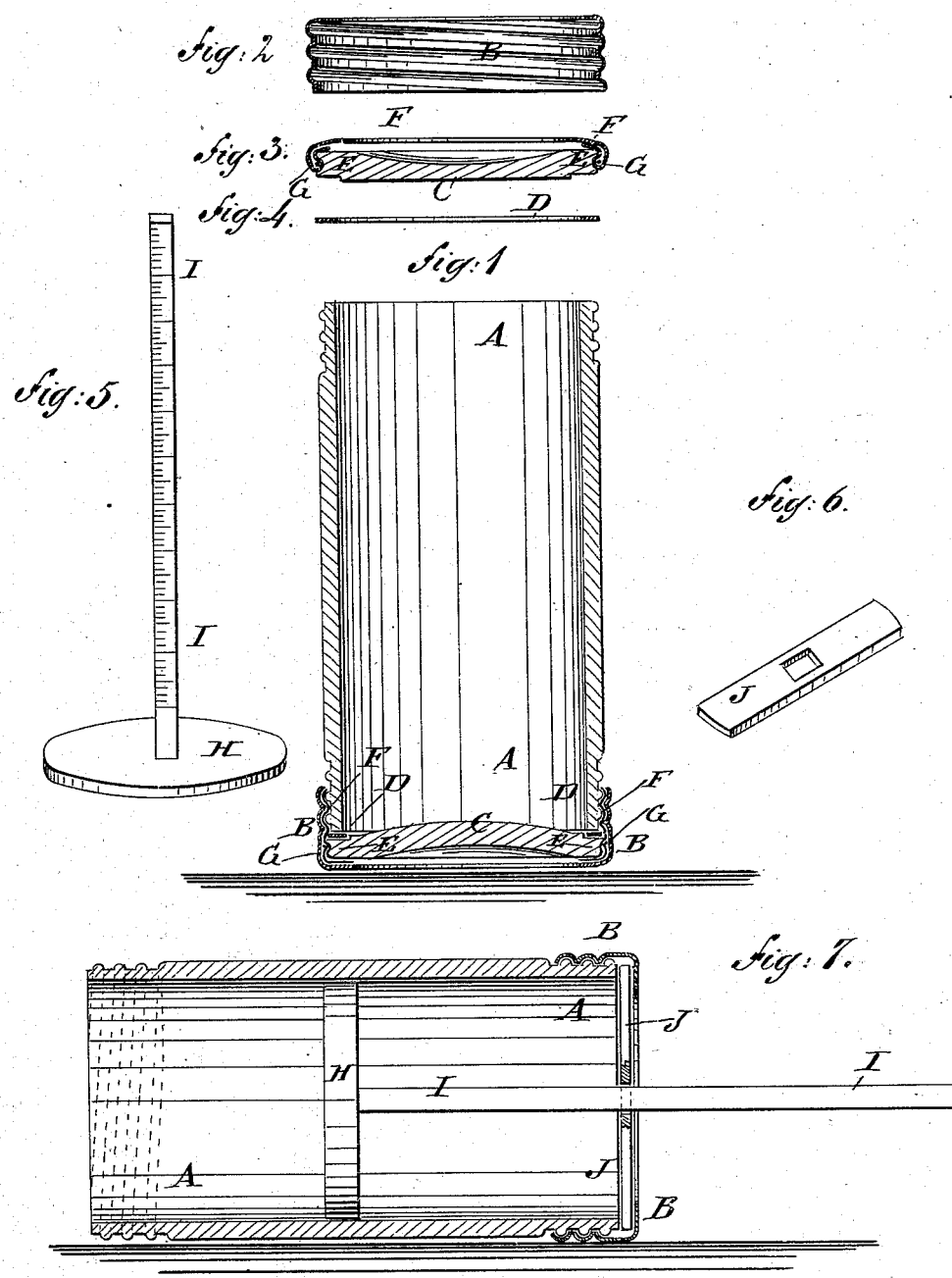

WILLIAM D. SPRAGUE, OF HENRY'S, NORTH CAROLINA.

VESSEL FOR PRESERVING BUTTER.

SPECIFICATION forming part of Letters Patent No. 263,610, dated August 29, 1882.

Application filed January 20, 1882. (No model.)

*To all whom it may concern:*

Be it known that I, WILLIAM DANN SPRAGUE, of Henry's, in the county of McDowell and State of North Carolina, have invented a new and useful Improvement in Jars or Vessels for Preserving Butter and other Substances, of which the following is a full, clear, and exact description.

Reference is to be had to the accompanying drawings, forming a part of this specification, in which similar letters of reference indicate corresponding parts in all the figures.

Figure 1 is a sectional side elevation of one of my improved jars or vessels shown as open at one end. Fig. 2 is a sectional side elevation of a screw-ring. Fig. 3 is a sectional elevation of a cover and rubber band. Fig. 4 is section of a packing-ring. Fig. 5 is a perspective view of the expeller. Fig. 6 is a perspective view of the expeller guide-bar. Fig. 7 is a sectional elevation of the jar or vessel shown as open at both ends, and showing the expeller in place.

The object of this invention is to promote the better preservation of the contents of the jar or vessel, and also to facilitate the removal of the contents thereof.

The invention consists in a peculiar construction of the jar or vessel and its appurtenances, whereby the contents are preserved to better advantage, as will be hereinafter more fully set forth.

The jar or vessel is constructed in the form of a cylinder open at both ends. The exterior ends of the cylinder are provided with screw-threads upon which screw-rings work to close the vessels after the butter or other material has been placed therein.

The vessel is filled (with butter, for example) by pressing the open cylinder directly into a mass of butter until the cylinder is filled up even with both ends. Disk-covers are then placed against the butter at each end of the cylinder, and over these disk-covers the screw-rings are applied and screwed firmly up, thus effectually closing both ends of the cylinder.

To remove the contents the screw-rings and covers are taken off and a plunger or pusher is pressed against one end of the contents of the cylinder, which pressure causes the contents to pass out at the opposite end of the cylinder. The rod of the plunger is graduated, so that the removal of any given quantity or weight of the contents may be readily known.

A represents a jar, which is made of wood or other material, and in cylindrical form and open at both ends.

Upon the outer surface of the ends of the jar A are formed screw-threads to receive the threads of the screw-rings B. The outer edges of the rings B are bent inward, or have inwardly-projecting flanges formed upon them to overlap the outer sides of the edges of the covers C, and thus clamp the said covers to the ends of the jar A. The covers C are made plain or slightly convex on their inner sides, are slightly concaved upon their outer sides, and are of such a size as to fit and rest upon the ends of the jar A. The edges of the inner sides of the covers C are slightly rabbeted to form seats for packing-rings D, which are made of paper, so that they will conform to all inequalities in the edges of the jar A, and thus form a tight joint, and so that the butter cannot come in contact with the rubber that closes the joints.

In the edge of the cover C is formed a groove, E, into which a rubber band, F, is drawn by a rubber ring, G, a cord, or other suitable means. The rubber band F is made of such a width as to cover, or nearly cover, the screw-threads of the jar A when the cover C is in place.

H is a disk, of wood or other material, and of such a size as to fit into and slide freely in the interior of the jar A.

To the center of the disk H is attached the end of a rod or shaft, I, to serve as a handle in operating the said disk. The shaft or handle I is kept in the center of the jar A by being passed through a guide-hole in the center of a cross-bar, J, which is made of such a length that its ends will rest upon the end of the jar A, where it will be kept in place by the screw-cap B, as shown in Fig. 7. The handle I of the disk H has a scale of division-marks formed upon it, which are so arranged, in connection with the size of the jar A, that a given space upon the handle will represent a given weight of butter—as, for instance, an inch space will represent a pound of butter.

The butter can be packed in the jars A in any convenient manner; but I prefer to place the butter in a vessel to a depth equal to or greater than the length of the jar and then press the jar down into the butter, and thus fill the said jar. This method of filling the jar packs the butter solidly and uniformly and prevents the butter from being injured by air packed into the jars between the layers of butter, as necessarily happens when the butter is packed in the ordinary manner. The loose parts of the rubber bands F are turned up over the outer sides of the covers C, and filled jars are placed in vessels provided with water to such a depth as to rise above the jars to the depth of two or three inches. The covers C and their packing-rings are then placed upon the ends of the jar A while beneath the surface of the water, and the rubber bands are turned down over the screw-threads of the said jar. The jar is then removed from the water, a strip of tin-foil is wrapped around the rubber bands, and the rings B are screwed on, closing the jar air-tight. The tin-foil causes the rings B to turn freely upon the rubber bands.

When butter is to be taken from the jar the ends of the said jar are uncovered, and the disk H is placed upon the butter at one end of the jar and pressed inward until the desired amount of butter projects from the other end of the jar. The projecting butter is then cut off in the shape of a circular cake. After a small amount of butter has been pushed out the cross-bar J is placed upon the handle I, with its ends resting upon the end of the jar A, and the ring B is screwed on to keep the said cross-bar in place. The jar is then placed in a vessel containing water to the depth of two or three inches, and a little water is poured into the upper end of the jar. In this way the butter will be kept sweet until the jar is emptied.

Having thus described my invention, I claim as new and desire to secure by Letters Patent—

1. The combination, with the cylindrical jar A, having screw-threaded open ends, of the rabbeted and grooved covers C, the rubber F, secured in the groove, the paper packing-rings D, and the screw-rings B, substantially as herein shown and described, whereby the jar can be closed air-tight, as set forth.

2. The combination, with the cylindrical jar A, having screw-threaded open ends and the screw-ring B, of the disk H, having handle I, and the guide-bar J, substantially as herein shown and described, whereby the butter can be readily removed from the said jar, as set forth.

WILLIAM DANN SPRAGUE.

Witnesses:
JNO. M. EDWARDS,
JNO. H. BOBBITT.